Dec. 9, 1969 L. BECKER 3,482,498

RIDGE PATTERN RECORDING APPARATUS

Filed May 9, 1967 2 Sheets-Sheet 1

Leonard Becker
INVENTOR.

BY Frank Wattles
ATTORNEY

Leonard Becker
INVENTOR

BY Frank Wattles

ATTORNEY

United States Patent Office 3,482,498
Patented Dec. 9, 1969

3,482,498

RIDGE PATTERN RECORDING APPARATUS

Leonard Becker, Pacific Palisades, Calif., assignor to TRW Inc., Redondo Beach, Calif., a corporation of Ohio Filed May 9, 1967, Ser. No. 637,192
Int. Cl. G03b *29/00, 27/52*
U.S. Cl. 95—12 10 Claims

ABSTRACT OF THE DISCLOSURE

A skin ridge pattern recording apparatus which optically produces a fingerprint recorded by the contact process. The skin ridges of the finger in contact with a continuous prism surface are illuminated by a collimated light source and the reflected skin ridge image is recorded by a camera in both apparatus. One apparatus has one prism and one light. The finger is rolled over the prism. The motion of the finger mechanically, electrically, or electro-optically adjusts the position of the light to the proper angle. Another apparatus has four prisms and three lights. Three prisms provide a nest for the finger so the skin ridges of the sides and ball are simultaneously each pressed upon one prism surface and illuminated, respectively, by one of the lights. The fourth prism side-reverses the image of one side ridge to approximate the rolled finger print.

BACKGROUND OF THE INVENTION

Field of the invention

An apparatus for producing an optical image of the skin ridge pattern of a portion of skin of an individual and more particularly an apparatus for recording the rolled finger impression of the finger ball and side ridges in which the ridges are recorded in black and the valleys in white.

Description of the prior art

Devices for producing an optical image of the skin ridge pattern of the finger have been developed and are within the state-of-the-art. All of these devices record an image of the fingerprint through optical techniques without the necessity of applying ink to the finger or other bodily part.

The purpose of optical techniques for making fingerprints and the like should be to obtain an equivalent of the inked fingerprint produced by the contact printing process. The optically formed fingerprint, if equivalent to the inked fingerprint, can be used in existing fingerprint files without requirement of transforming the files. Presently there is no optical device for making fingerprints which are the equivalent of inked fingerprints which are developed by rolling the finger to record the side ridges and the ball ridges. Existing optical means, such as those listed below, record only the skin ridge pattern of the ball of the finger and do not record the ridge pattern at the side of the finger.

3,138,059, White, Means and Method for Producing Image of Papillary Ridges
3,174,414, Myer, Optical Apparatus for Recording Skin Ridge Signalments
3,200,701, White, Method for Optical Comparison of Skin Friction-Ridge Patterns
3,282,152, Myer, Signalment Recording Apparatus This invention improves upon the prior art by providing an apparatus capable of optically recording the side ridges and ball ridges of the finger in a single operation.

SUMMARY OF THE INVENTION

The invention of the subject patent lies in an apparatus for producing an optical image of the skin ridge pattern of a portion of skin. The apparatus comprises optical means defining an internally reflecting surface adapted to have a rolled impression of a skin ridge pattern formed thereon by contact therewith of the skin ridge pattern of a bodily part of a subject, means for illuminating the skin ridge pattern, and light image recording means for recording the image of the skin ridge pattern.

In accordance with one phase of this invention, the optical means includes a first, second and third dense medium optical element, each having an internally reflecting surface adapted to have a skin ridge pattern formed thereon by contact of the skin ridge pattern of the bodily part of a subject from the side of an adjacent rare medium thereby causing frustration of total reflection at the points of contact. The second and third optical elements are each mounted on the first optical element proximate to the contact area and adapted to receive the bodily part of the subject therebetween and to hold the bodily part in a vice grip, thereby simultaneously forming skin ridge patterns on the first, second, and third optical elements.

To produce an optical image of a skin ridge pattern of a portion of skin which portion is rolled on and in accordance with another phase of this invention, in addition to the optical means, illuminating means and recording means described, the apparatus comprises a sensor means, first connecting means and second connecting means. The sensor means detects movement of a bodily part upon the contact area. The second connecting means links the sensor means with the illumination means to adjust the position of the illumination means so that the angle of incidence of the light rays falling upon the bodily part remains constant as the bodily part is rolled over the contact area.

DESCRIPTION OF THE PREFERRED EMBODIMENTS

Figure 1A:
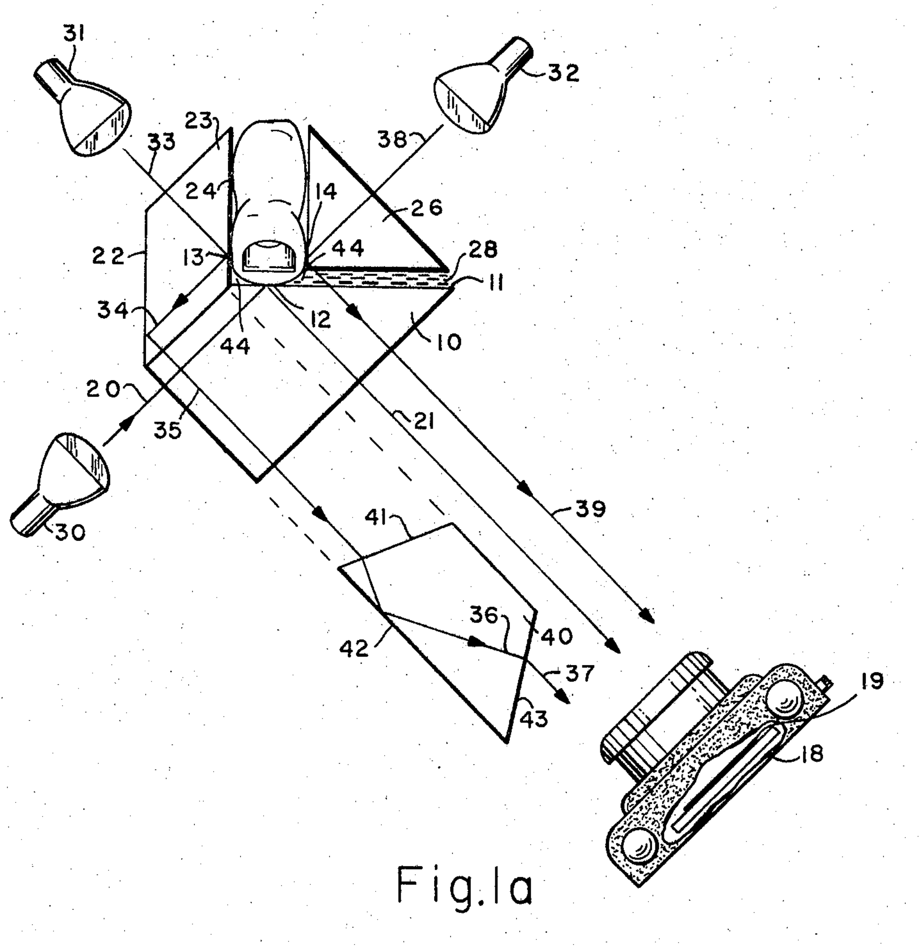
FIGURE 1*a* is an elevation view of an embodiment of the present invention.

Referring now to the drawings, in FIGURE 1*a* apparatus is shown which produces an approximation of the ball and side ridges. An optical element or glass member 10 in the form of a prism is utilized to provide a totally reflecting surface 11 against which a body part such as the finger 17 may be pressed. A virtual image of the ridge pattern 12 of the ball of the finger 17 is formed by means of a beam of light 20 emanating from a light source 30.

The rays of light of the beam 20, which for best results are collimated, will be absorbed at the point of contact of the friction ridges 12 with the totally reflecting surface 11. Rays of light of beam 20 not exceeding the critical angle of incidence will be totally reflected from the internal surface 11 adjacent to the valleys of the friction ridges 12. The reflected beam 21 enters a camera 18 or other image recording device 19 and the virtual image of the ridge pattern 12 is recorded.

To record the side ridges 13 and 14 of the finger 17, two additional prisms are mounted upon the first prism 10. The two additional prisms 23, 26 provide support for the finger 17 and reflect the image of the ridges 13, 14 in the same manner reflected by prism 10. A rhomboid shaped second prism 23 is mounted upon first prism 10 adjacent to the contact area for the ball of the finger 17. To form a virtual image of the ridge pattern 13, a source of light 31 directs light rays, which for best results are collimated of light beam 33, to the side ridges 13 of the finger 17 located upon the contact area of surface 24 of prism 23. Rays of light of light beam 33 are not to exceed the critical angle of incidence. The internally reflected light beam 34 passes from the contact area of the first internal surface 24 to the opposite second internal surface 22. Surface 22 is silvered to obtain total reflection. Prism 23 has an identical index of refraction as prism 10. Thus, light beam 35 reflected off silvered surface 22 passes unrefracted through prism 10. If beam 35 were recorded, the image 13 would be side reversed from that of the actual fingerprint. To record an undistorted fingerprint, an additional side reversal is necessary for which a Dove inverting prism 40 is provided. Prism 40 is of such a geometry that the image of the side fingerprint 13 is not only side reversed, but is shifted closer to the fingerprint image of the ball 12. Light beam 35 from the second prism 23 and first prism 10 enters at the admitting surface 41 from a rarer density medium into the more dense prism 40. Beam 35 is refracted at surface 41 and reflected off a silvered internal surface 42 of the prism 40, being totally reflected at an incident angle less than the critical angle. The resultant light beam 36 passes to the exit surface 43 of prism 40 where, upon exiting into the medium outside prism 40 having the same density as the medium near the point of entrance on the admitting surface 41, the beams 36 are refracted. Resulting beam 37 is parallel to the beam 35 entering the prism 40 but is shifted toward the ball image carrying beam 21 and side reversed due to the internal reflection at the silvered surface 42. Beam 37 is recorded at the camera 18 or other recording device 19 which simultaneously records the image of the ball finger 12.

The third prism 26 is mounted upon the first prism 10, thereby providing the contact area and means for recording the second side 14 of the finger 17. Third prism 26 is of identical index of refraction as the first prism 10 and second prism 23 and is mounted proximate to the contact area of the first prism 10 so that the finger 17 in contacting the first prism 10 and second prism 23 will contact, also, the third prism 26 and be held between the second rays of prism 23 and third prism 26 while resting upon the first prism 10. A source of light 32 directs rays of light, which for best results are collimated of light beam 38, to the contact area upon the third prism 26, whereupon the image of the finger ridges 14 is reflected in the same manner as image 12 and image 13. Light beam 38 at less than the critical angle of incidence is reflected from the internal reflecting surface 27. The resulting beam 39 passes through the adjacent first prism 10 to the camera 18 or other recording device 19 where the second side friction ridge pattern 14 is recorded simultaneously with the ball friction ridge pattern 12 and the opposite side friction ridge pattern 13. The resultant fingerprint image, as shown in FIGURE 1*a*, will contain white bands representing the dead-bands 44 of noncontact between the area of contact of the ball of the finger and of the sides of the finger. This dead-band area 44 can be reduced by increasing the area of actual contact of the sides of the finger with the second prism 23 and third prism 26. To facilitate a narrowed white band, the third prism 26 may be made movable and adjustable to the size of the finger 17 and the pressure desired, the finger 17 being held in a vice-like grip between the rhomboid second prism 23 and the third prism 26. Where the third prism is movable, dirt and other foreign particles may appear between the surfaces of the first prism 10 and third prism 26 causing distortion of the fingerprint image.

A thin film 28 of lubricant may reduce the difficulties of contact between the two prisms. If the lubricant film 28 is sufficiently thin, the image 14 will not be distorted by refraction at the interfaces of the film 28 and prisms 10, 26.

It is noted that although the first prism 10 and third prism 26 are shown as isosceles right triangular prisms and the rhomboid prism 23 is shown as 45 degrees by 135 degrees, this invention contemplates any geometry whereby the angle of incidence and reflection occur within the prism so as to achieve the purposes of this invention. The first prism 10, third prism 26, and inverting prism 40 geometries provide reflection from one surface while the geometry of the rhomboid prism 23 allows two reflecting surfaces 24, 22. This configuration provides the desired approximation of the fingerprint or the like.

Figure 1B:
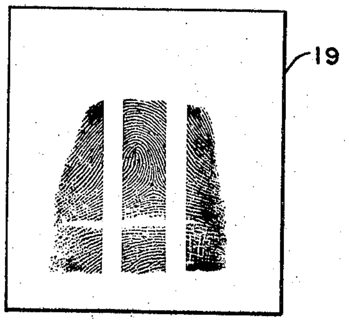
FIGURE 1*b* is a view of the fingerprint approximation produced in FIGURE 1*a*.
Figure 2:
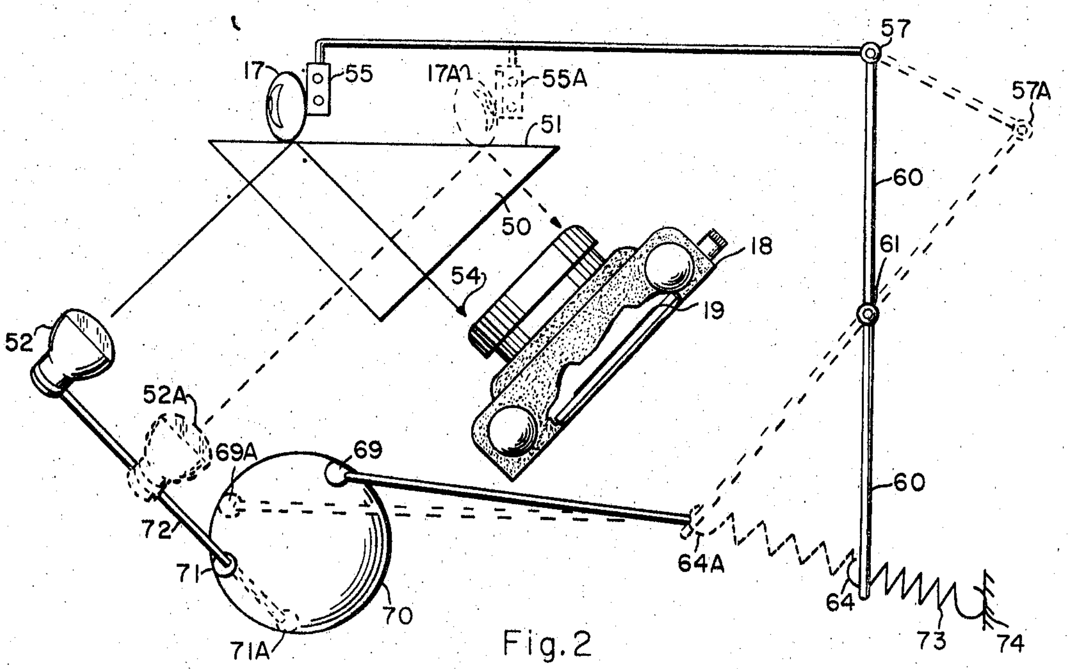
FIGURE 2 is an elevation view of another embodiment of the invention.

In FIGURE 2, an alternate and preferred embodiment produces a high fidelity rolled fingerprint impression not involving the approximation of FIGURE 1. Only one prism 50 is necessary. The finger is rolled over the contact area of the surface 51 in the same manner as in the contact inking process. A light source 52 directs rays of light, which for best results are collimated, of beam 53 at less than the critical angle of incidence upon the internal reflecting surface 51 adjacent to the finger 17. A finger guide 55 is mounted near the contact area of surface 51 so that the finger 17 will touch surface 51 and guide 55 simultaneously. As the finger 17 is rolled over surface 51, guide 55 is caused to move in the direction of finger 17. Remote-control means connect a camera 18 or other image recording device 19 to the guide 55 to start recording when the guide 55 is moved and to stop recording when the guide 55 is stopped. Light beam 54 reflected from surface 51 passes to a camera 18 or recording device 19 and a virtual image of the friction ridges of the finger in contact with surface 51 during the rolling process is recorded. Guide 55 can be connected, electrically or electro-optically to the light source 52 so that as the guide 55 moves, the light source 52 is caused to move a proportionate distance in order that the light beam 53 maintains a constant angle of incidence upon the internal surface 51 as the finger 17 is rolled over the contact area. In FIGURE 2, the connection between the finger guide 55 and the light source 52 is illustrated as a mechanical connection. The illustration is but one example of many mechanical means for accomplishing the same results. A rigid member 56 is attached to the finger guide 55 at one end and hinged at the opposite end 57 to a second rigid member 60. Member 60 is pivotally pinned at an intermediate point 61 thereon and engages a third rigid member 65 at hinge 64. The ratio of the lengths of member 60 between hinge 57 and pin 61 and between hinge 64 and 61 is proportionate to the ratio of the distance the finger 17 may be rolled over surface 51 and the distance light source 52 must be moved to maintain a constant angle of incidence of light beam 53 at the finger 17. Member 65 couples member 60 to a take-up element 70. Element 70 is capable of translating linear movement in one direction into a proportionate linear movement in a difference direction. Rotatable disks or cylinders are illustrations of take-up elements. Member 65 is mounted on element 70 at pivot 69. A fourth rigid member 72 at one end is mounted on element 70 at pivot 71 and at the other end is attached to light source 52. Movement of the finger guide 55 caused by rolling of the finger 17 in contact with surface 51 to any lateral position 55A shifts the hinge 57 laterally to a new position 57A and pivots member 60 about pin 61 shifting hinge 64 to a new position 64A, also laterally shifting member 65. The movement of member 65 causes rotation of element 70 and a shift of member 72 and light source 52 in a direction which maintains a constant angle of incidence of light beam 53 upon surface 51 adjacent to the finger 17 during movement. A spring 73 or other bias means connects hinge 64 to a fixed point 74. When the finger is removed from surface 53, the spring 73 will return the guide 55 and light source 52 to their normal positions. The spring 73 can be placed anywhere in the connecting structure to accomplish the same result.

Figure 3:
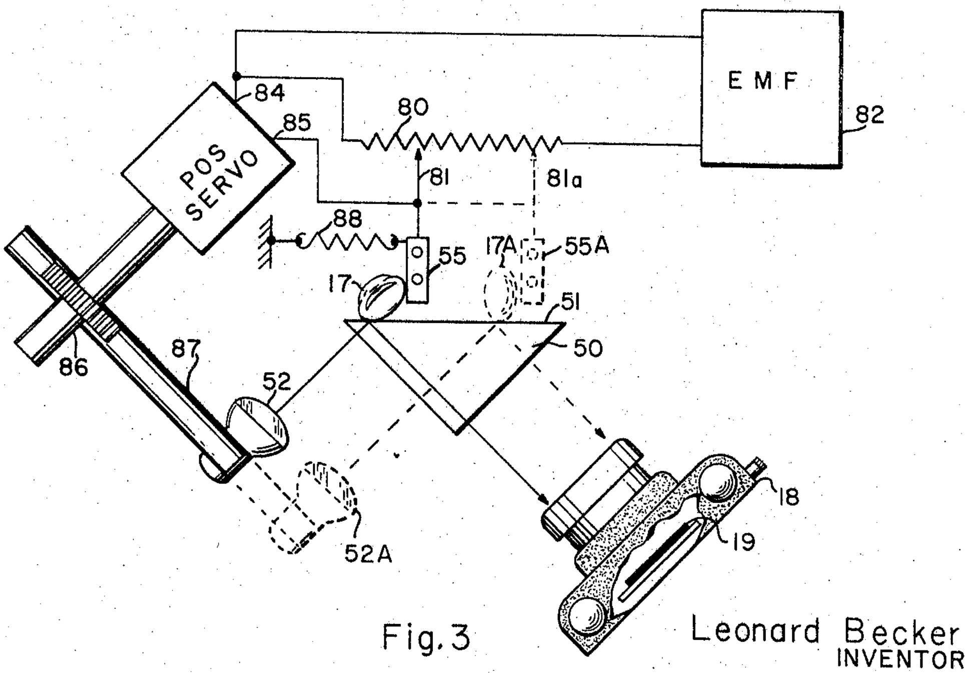
FIGURE 3 is an elevation view of a third embodiment of the invention.

Electrical connection between the guide 55 and light source 52 is represented in FIGURE 3. A rheostat 80 powered by an electromotive force 82 activates a positioning servo 83 with a voltage (or current proportional to the change of position of the guide 55. The sliding contact 81 of the rheostat 80 is fixed to the guide 55 so a movement of the finger 17 and guide 55 causes a changing voltage (or current) across terminals 84 and 85. The change in voltage rotates shaft 86 of the servo 83, positioning light source 52 which is joined to shaft 86 by arm 87. The shaft 86 rotates sufficiently to shift the position of light source 52 to maintain a constant angle of incidence of beam 53 upon the internal surface 51 of prism 50 adjacent to the finger 17 being rolled over surface 51. A spring 78 or other bias means is connected to guide 55 to return the guide 55 to normal position. Included in electrical connection of this invention are electro-optical sensors such as photoelectric cells which produce a voltage proportional to the movement of guide 55. The photoelectric cell or the like may be substituted for the rheostat 80.

While certain embodiments of the invention have been described in detail herein and shown in the accompanying drawing, it will be evident that various additional modifications are possible in the arrangement and construction of its components without departing from the scope of the invention.

I claim:

1. A device for producing an optical image of the skin ridge pattern of a portion of skin comprising:
optical means having an internally reflecting surface for defining a rolled impression of said skin ridge pattern formed thereon by contact therewith of said skin ridge pattern;
means for illuminating said skin ridge pattern; and
light image sensitive recording means for recording the image of said skin ridge pattern.

2. A device as in claim 1 wherein said optical means comprises:
a first optical means having a first, second and third dense-medium optical element, each of said elements having an internally reflecting surface for defining said skin ridge pattern formed thereon by contact therewith of the skin ridge pattern, said second and third optical elements each mounted on said first optical element proximate to the contact area of the skin ridge pattern and adapted to receive the bodily part of the subject therebetween and to hold the bodily part in a vice grip, thereby simultaneously forming skin ridge patterns on said first, second, and third optical elements.

3. A device as in claim 2 wherein said optical means further comprises:
a second optical means disposed between the internally reflecting surface of said second optical element and said recording means for side-reversing and adjusting the location of the skin ridge pattern image from said second optical element relative to the skin ridge pattern from said first optical element.

4. A device as in claim 3 wherein:
the first optical element is an isosceles triangular prism;
the second optical element is a rhomboid prism having a first internally reflecting surface and a second internally reflecting surface, the first surface adapted to have a skin ridge pattern formed thereon and the second surface having a silver coating to totally reflect the skin ridge pattern image transmitted from the first surface;
the third optical element is an isosceles triangular prism movably mounted on the first optical element in order to adjust the size of the contact area according to the size of the bodily part of the subject and to adjust the vice-grip pressure upon the bodily part;
said second optical means is a dove-inverting prism; and
the illuminating means is a source of collimated light.

5. A device as in claim 1 and further comprising:
sensor means for detecting movement of a bodily part upon the contact area of the skin ridge pattern;
first connecting means linking said sensor means with said recording means for starting operation of the recording means when movement of a bodily part upon the contact area is detected and for stopping operation when the bodily part is removed from the contact area; and
second connecting means linking said sensor means with said illumination means for adjusting the position of the illumination means so that the angle of incidence of the light rays falling upon the bodily part remains constant as the bodily part is rolled over the contact area.

6. A device as in claim 5 wherein:
said illuminating means is a source of collimated light; and
said sensor means is a guide movably positioned near one end of the contact area of said first optical element so that the bodily part contacts the guide and the contact area at the same time and as the bodily part is rolled over the contact area, the guide is caused to move coincident to the movement of the bodily part.

7. A device as in claim 6, and further comprising:
bias means connected to said guide for returning the guide to a normal position near one end of the contact area when the bodily part is removed.

8. A device as in claim 7 wherein said second connecting means comprises:
a rotatable take-up element;
third connecting means linking said guide to said take-up element so that displacement of the guide causes an equal linear displacement through rotation of said take-up element; and
fourth connecting means linking said collimated light source to said take-up element so that rotation of the take-up element causes the light source to be proportionately displaced as the guide is displaced.

9. A device as in claim 7 wherein said second connecting means comprises:
a rheostat electrically connecting to said guide to produce an electric signal proportional to the guide position;
an electromotive force connected to said rheostat;
a positioning servo electrically connected to the rheostat and driven by the electric signal from the rheostat, said servo having a rotatable shaft which rotates at a rate proportional to the rate of change of the electric signal received from the rheostat; and
fifth connecting means linking the shaft of said servo to said collimated light source so that rotation of the shaft causes the light source to be proportionately displaced as the guide is displaced.

10. A device as in claim 7 wherein said second connecting means comprises:
a photoelectric device optically connected to said guide to produce an electric signal proportional to the guide position;

a power source connected to said photoelectric device; a positioning servo electrically connected to the photoelectric device and driven by the electric signal from the photoelectric device, said servo having a rotatable shaft which rotates at a rate proportional to the rate of change of the electric signal received from the rheostat; and fifth connecting means linking the shaft of said servo to said collimated light source so that rotation of the shaft causes the light source to be proportionately displaced as the guide is displaced.

References Cited

UNITED STATES PATENTS

| | | | |
|---|---|---|---|
| 3,138,059 | 6/1964 | White | 95—12 |
| 3,174,414 | 3/1965 | Myer | 95—1.1 |
| 3,282,152 | 11/1966 | Myer | 95—12 |

NORTON ANSHER, Primary Examiner

RICHARD A. WINTERCORN, Assistant Examiner

U.S. Cl. X.R.

355—40